United States Patent [19]

Calianno

[11] Patent Number: 5,037,042
[45] Date of Patent: Aug. 6, 1991

[54] STABILIZED SQUARE PARACHUTE
[75] Inventor: Carl T. Calianno, North Wales, Pa.
[73] Assignee: The United States of America as represented by the Secretary of the Navy, Washington, D.C.
[21] Appl. No.: 518,619
[22] Filed: Apr. 18, 1990
[51] Int. Cl.$^5$ .............................................. B64D 17/02
[52] U.S. Cl. .................................... 244/145; 244/152
[58] Field of Search ................................ 244/142, 145

[56] References Cited

U.S. PATENT DOCUMENTS

| | | |
|---|---|---|
| 1,511,154 | 10/1924 | Ball . |
| 1,618,613 | 2/1927 | Turner . |
| 1,951,864 | 3/1934 | Driggs, Jr. . |
| 2,374,627 | 4/1945 | Strong . |
| 2,683,575 | 7/1954 | Heinrich . |
| 2,746,699 | 5/1956 | Hart . |
| 3,104,856 | 9/1963 | Knacke et al. . |
| 3,195,842 | 7/1965 | Wilson . |
| 3,420,478 | 4/1967 | Ferguson ............................ 244/142 |
| 3,474,990 | 10/1969 | Flatau . |
| 3,727,863 | 4/1973 | Bockelmann . |
| 3,893,641 | 7/1975 | Sutton . |
| 4,013,248 | 3/1977 | Kalabukhova et al. .. |
| 4,588,149 | 5/1986 | Gold . |
| 4,638,961 | 1/1987 | Rousseau . |
| 4,778,131 | 10/1988 | Calianno ............................ 244/145 |

Primary Examiner—Joseph F. Peters, Jr.
Assistant Examiner—Carla Mattix
Attorney, Agent, or Firm—James V. Tura; James B. Bechtel; Susan E. Verona

[57] ABSTRACT

A low-cost square-shaped parachute has trapezoidal panels attached to its canopy sides for controlling the air flow during operation to maximize drag and stability.

6 Claims, 2 Drawing Sheets

STABILIZED SQUARE PARACHUTE

STATEMENT OF GOVERNMENT INTEREST

The invention described herein may be used by and for the Government of the United States of America for governmental purposes without the payment of any royalties thereon or therefor.

BACKGROUND OF THE INVENTION

This invention relates generally to aerodynamic decelerators and more particularly to the aerodynamic stabilization of parachutes having square canopies.

When dropping a store such as a sonobuoy into the ocean from a high altitude it is necessary to assure proper orientation upon impact. This requires the use of a parachute which has high drag to slow the store's descent and stability to minimize its oscillations. Parachute instability, caused by destabilizing aerodynamic side forces on the canopy, is translated to the store through the parachute's suspension lines, causing the store to oscillate, adversely affecting impact orientation. An air-deployed payload which has a video camera mounted therein for transmission during air descent also requires a parachute with high drag efficiency and extreme stability to prevent oscillation of the payload during descent. Since a parachute's stability and drag efficiency are inversely related, parachutes with sufficient drag efficiency for these applications often lack sufficient stability, and vice versa.

Additionally, many of the currently used parachutes which provide either high drag efficiency or good stability have a complex design and are therefore difficult and expensive to manufacture. For example, the guide surface parachute, shown in U.S. Pat. No. 2,683,575 to Heinrich, is the most stable parachute available today. Although very stable, its drag efficiency is poor and it has a complex geometry. Other parachutes, such as the cross-type, require from 8 to 12 suspension lines to provide sufficient drag for the applications mentioned above, adding not only to cost and packing complexity, but also to the potential for entanglement problems.

Attempts to simplify parachute design and yet maintain sufficient drag efficiency have led to the use of parachutes with square canopies. Such canopies, although simple, are inherently unstable. Stability has been improved by reducing the ratio of suspension line length to nominal canopy diameter, and by using different suspension line arrangements, such as suspension line shapers. Further enhancements have been achieved by providing carefully located slots in the square canopy. Although these modifications are effective in improving the stability of the square parachute, a parachute with a greater stabilizing moment than the guide-surface parachute is desired, without a significant degradation in drag or design simplicity.

SUMMARY OF THE INVENTION

It is therefore an object of the present invention to provide a stable means for dropping a store such as a sonobuoy into the ocean from a high altitude such that it impacts at the proper orientation. Another object is to provide a parachute which has high drag efficiency. It is also an object to provide a square-shaped parachute which has improved stability. Yet another object is to provide a stable parachute which is low-cost and easy to manufacture and which has a simple design which will minimize packing and entanglement problems. Another object of the present invention is to provide a stabilizing means with a simple geometry which can easily be integrated into the slotted-square parachute.

Briefly, these and other objects are accomplished by a square-shaped parachute with trapezoidal panels attached to the sides thereof for shaping the canopy during operation to maximize drag and stability. The panels give the canopy uniform airflow separation around the leading edge thereof and a large restoring moment.

Other objects, advantages, and novel features of the invention will become apparent from the following detailed description of the invention when considered in conjunction with the accompanying drawings wherein:

DESCRIPTION OF THE PREFERRED EMBODIMENT

Figure 1:
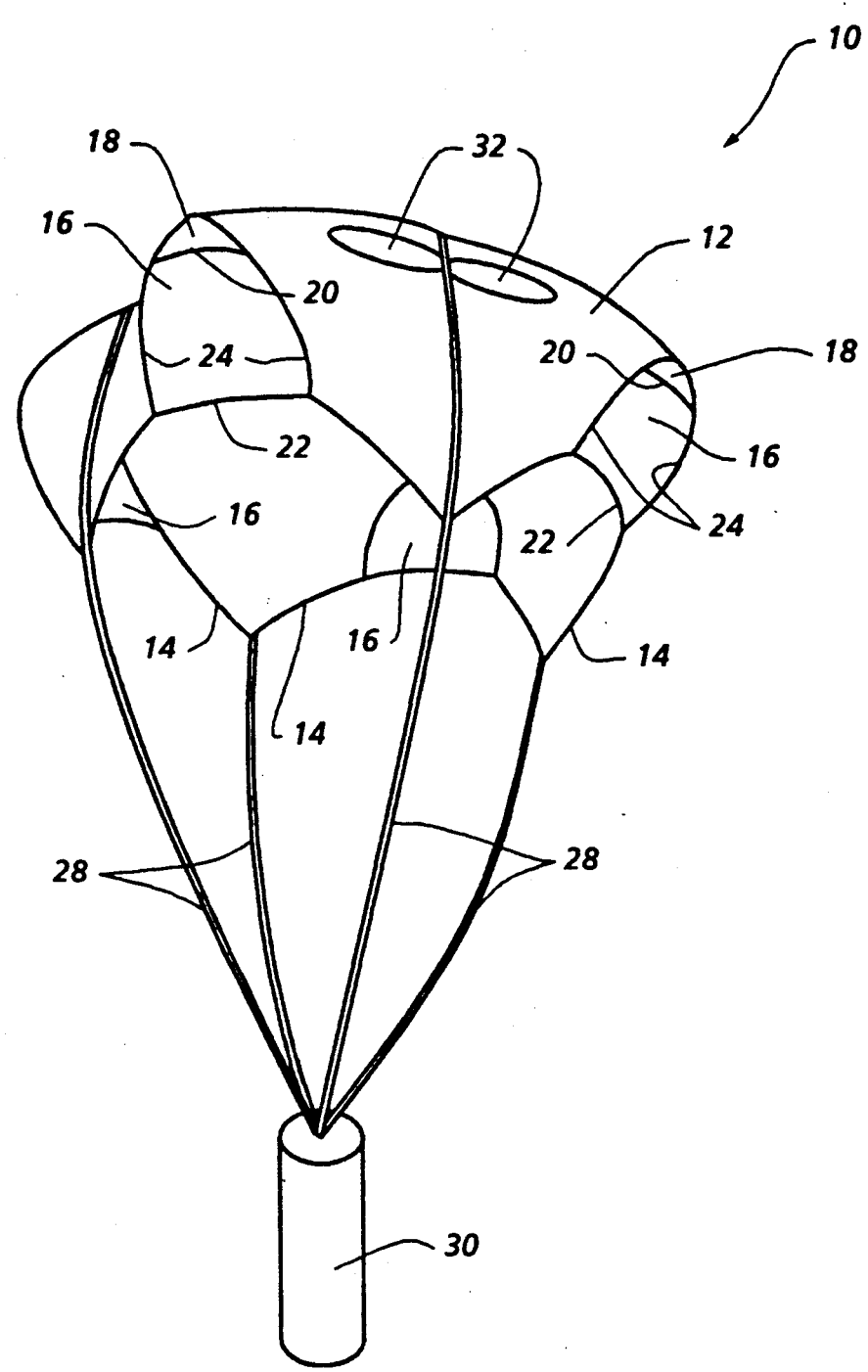
FIG. 1 is a view of a parachute according to the present invention in operation.

Referring now to the drawings wherein like characters designate like or corresponding parts throughout the several views, there is shown in FIG. 1 a parachute 10 according to the present invention in operation. Canopy 12 of parachute 10 is essentially square-shaped, with each side or edge 14 being of equal length L. The length L is selected based on the desired drag, drag increasing with increasing canopy area. Canopy 12 may be fabricated from any material known to those skilled in the art to be effective parachute material, such as nylon, and the canopy may be made to be continuous or to have interruptions therein, such as slots or mesh portions.

Fixed to each of the four sides or edges 14 of canopy 12 is a panel 16 of the same or similar material as the canopy. Each panel 16 is configured and attached so that during operation the airflow into canopy 12 is maximized to increase drag, there is uniform airflow separation around the leading edge of the canopy to provide stability, and the stabilizing force or restoring moment is maximized. Vents 18 formed between each panel 16 and canopy edge 14 help to reduce vortex growth around the periphery of parachute 10 prior to vortex shedding, further reducing imbalanced aerodynamic side forces which reduce the stability of the parachute.

Figure 2:
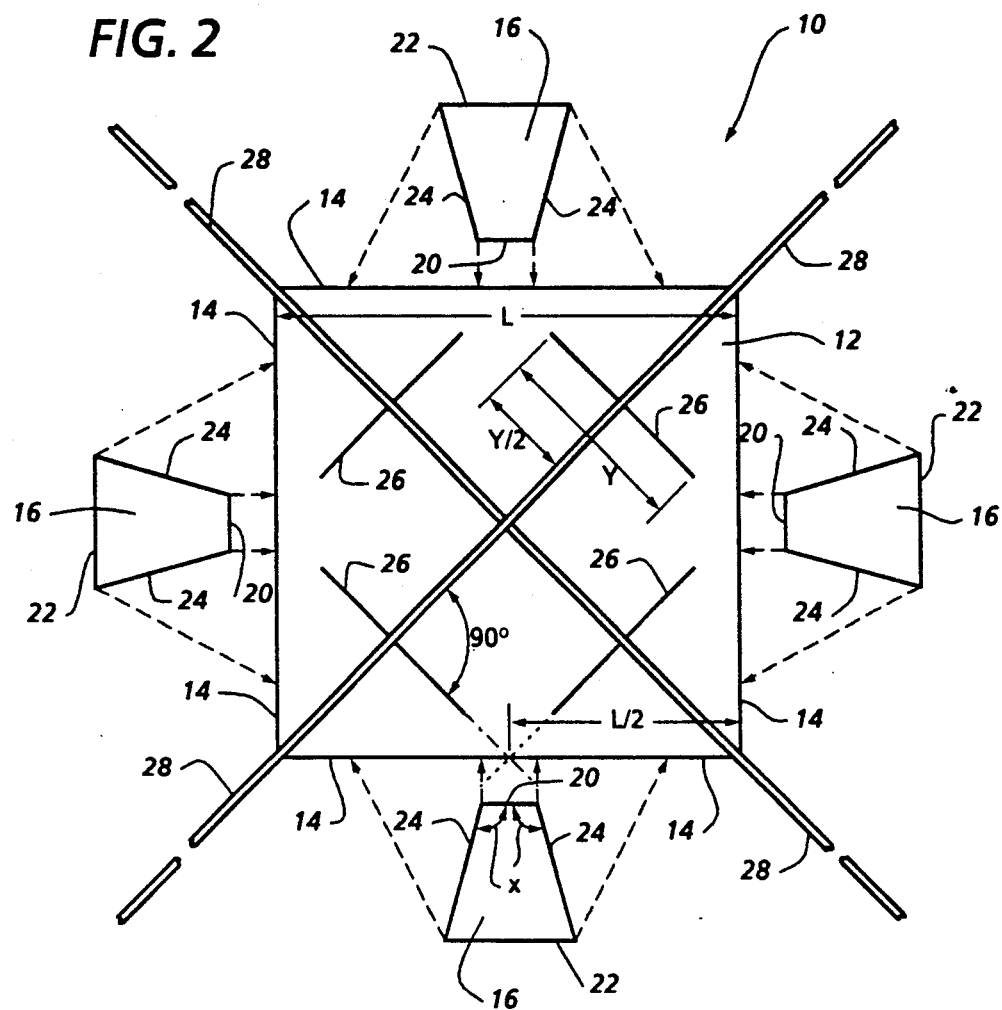
FIG. 2 is a top view of the canopy and panels of the parachute of FIG. 1 lying flat and detached to show details of the canopy.
Figure 3:
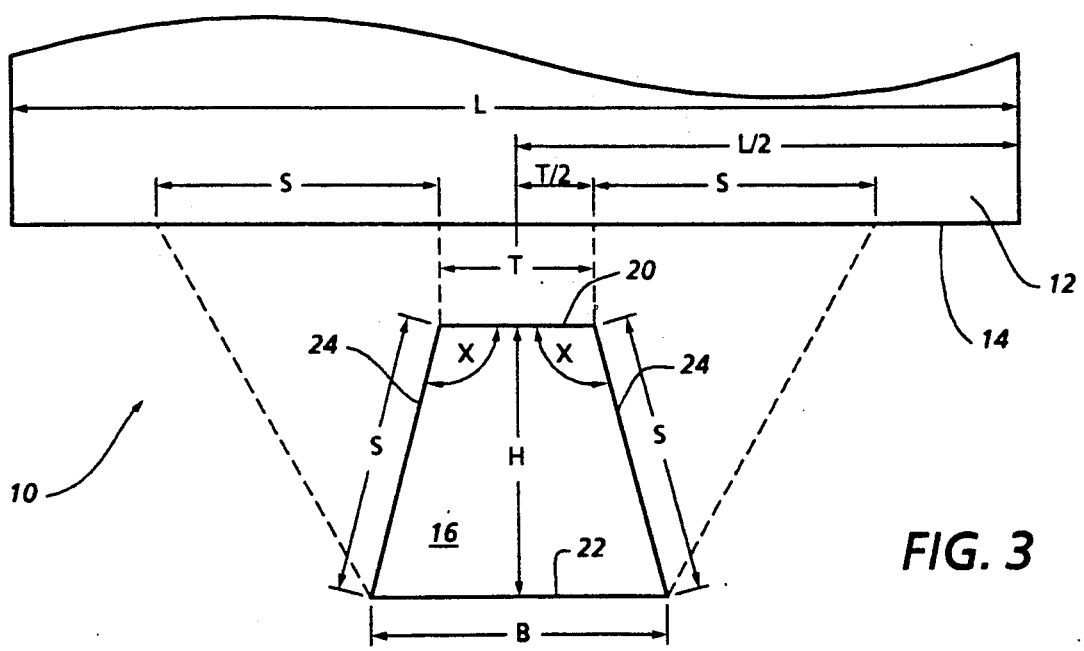
FIG. 3 is an enlarged view of one of the panels of FIG. 2.

FIG. 2 shows canopy 12 lying flat, with unattached panels 16 positioned adjacent to their respective canopy edges 14 and oriented for attachment thereto, and FIG. 3 shows just one panel and its respective edge. In a preferred embodiment, each panel 16 is in the shape of a trapezoid having a top 20 of length T, a parallel base 22 of longer length B, and side legs 24 of equal length S which form equal obtuse angles x, with respect to top 20. Height H is the distance between base 22 and top 20. Panel 16 is oriented with top 20 adjacent to edge 14 and centered with respect thereto. In other words, panel 16 is positioned so that the center of top 20 is adjacent to the center of edge 14. Panel 16 is attached, as by sewing, along its two side legs 24 to canopy edge 14 along two portions thereof, each portion being of length S, or equal in length to side legs 24. The length of the distance along edge 14 between the two attached portions is equal to T, the length of top 20. The space thus created between top 20 and edge 14 forms vent 18 when parachute 10 is in operation. If vents 18 are not desired, top 20 may be attached to edge 14 to form one continuous attached portion of the edge of length 2S+T.

The size of panels 16 may vary, depending upon the desired drag and stability. Generally, larger panels 16 result in more stability and smaller ones result in more drag. Optimum drag and stability performance can be achieved when T=0.13 L, angle x equals approximately 104°±3°, and H ranges from 0.10 L to 0.28 L. The most stable parachute is achieved with a panel having T=0.13 L, x=104°, and H=0.28 L. The parachute with the best drag efficiency has a panel with T=0.13 L, x=104° and H=0.10 L.

In a preferred embodiment, slots 26 are cut through canopy 12 as shown in FIG. 1 to further reduce the destabilizing effect of vortex shedding by the periphery of the canopy during operation of parachute 10. Each slot length Y is preferably between 30% and 40% of the length L of edge 14, most preferably 30%. Slots 26 of this preferred embodiment are positioned so that continuous imaginery lines, each colinear with only one of the slots, intersect to form a square whose corners bisect sides 14 of canopy 12. Furthermore, slots 26 may be positioned so that each diagonal of canopy 12 bisects exactly two of them. More details relating to the optimum location of slots 26 are disclosed in U.S. Pat. No. 4,778,131 to Calianno, incorporated by reference herein.

Suspension lines 28 extend from the corners of canopy 12 and are attached to a store 30. In the preferred embodiment having slots 26 in canopy 12, they are attached across the entire diagonal length of the canopy, with one suspension line 28 overlapping the other at the center of the square. The length suspension lines 28 extend from the corners may vary, typically being the same length as the nominal diameter of canopy 12. In this embodiment, suspension lines 28 are attached to canopy 12 when it is lying flat so that the material of the canopy is interconnected at the midpoint of each slot 26 by the suspension lines. Therefore, when canopy 12 is inflated during operation of parachute 10, each slot 26 actually forms two openings 32, one on each side of suspension line 28, as shown in FIG. 1. Suspension lines 28 may be fabricated from any commonly used material, such as nylon.

In operation, the extended ends of suspension lines 28 are attached to store 30, and parachute 10 and store 30 are dropped. Canopy 12 inflates and assumes the shape shown in FIG. 1, with air flowing into, through, and around the canopy so as to increase stability without sacrificing drag significantly.

Three different embodiments of the present invention having slots in the canopy are shown in Table I.

TABLE I

| PANEL DIMENSIONS AS A FUNCTION OF CANOPY EDGE LENGTH, L. | | | |
|---|---|---|---|
| Base length B | Top length T | Height H | Slot length Y |
| .27 L | .13 L | .28 L | .3 L |
| .24 L | .13 L | .21 L | .3 L |
| .18 L | .13 L | .10 L | .3 L |

Wind tunnel tests were performed on these three embodiments, as well as on a guided surface parachute for comparison. The moment coefficient, which is normalized to canopy surface area, was calculated for each parachute at various angles of the parachute with respect to the drag direction. The moment is the product of the measured normal force and a moment length equal to the distance from the apex of the canopy to the suspension line confluence. The greater the coefficient, the stronger the stabilizing force of the parachute. The greatest moment coefficient was obtained using the parachute having panels with dimensions T=0.13 L, B=0.27 L, and H=0.28 L.

The parachute of the present invention can provide 40% more drag than a guide surface parachute which offers similar levels of stability, or provide twice the stability and 5% more drag. Further information concerning the method of wind tunnel testing and more detailed results therefrom are available in the proceedings of the AIAA 10th Aerodynamic Decelerator Systems Conference, Apr. 19, 1989, in the article "The Development of the Panel Stabilized Slotted-Square Parachute" by Carl T. Calianno, incorporated by reference herein.

Some of the many advantages and novel features of the invention should now be readily apparent. For instance, an aerodynamic decelerator has been provided for stabilizing air-dropped stores. It is particularly useful for dropping a sonobuoy into the ocean from a high altitude in such a way that it impacts at the proper orientation. A square-shaped parachute has been provided which has both high drag efficiency and improved stability. A stable parachute has been provided which is low-cost and easy to manufacture and which has a simple design which minimizes packing and entanglement problems. The present invention provides a stabilizing means with simple geometry which can easily be integrated into the slotted-square parachute.

Other embodiments and modifications of the present invention may readily come to those of ordinary skill in the art having the benefit of the teachings presented in the foregoing description and drawings. Therefore, it is to be understood that the present invention is not to be limited to such teachings presented, and that such further embodiments and modifications are intended to be included within the scope of the appended claims.

What is claimed is:

1. In a parachute of the type having a square-shaped canopy and having suspension lines extending from the corners thereof, the improvement comprising:
   four trapezoidal panels, each having a top, a longer parallel base, and equal-lengthed side legs which form equal obtuse angles with respect to the top, each panel being fixed along the lengths of its two side legs to a different one of the four edges of the square-shaped canopy and positioned with the center of the top being adjacent to the center of the edge of the canopy.

2. The parachute of claim 1 further comprising slots disposed through the canopy for substantially reducing the effects of vortex shedding by the canopy.

3. In a parachute of the type having a square-shaped canopy with sides of length L and having suspension lines extending from the corners thereof, the improvement comprising:
   four trapezoidal panels having a top of length T and a parallel base of longer length B, a height H, the height being the distance between the base and the top, and side legs of equal length S, which side legs form equal obtuse angles of approximately 104° with respect to the top, each panel being fixed along its two side legs to a different one of the four sides of the canopy and positioned with the center of the top being adjacent to the center of the side of the canopy, leaving an unfixed portion along the side of the canopy which is between the parts thereof which are fixed to the side legs, the unfixed portion being equal in length to the top of the trapezoidal panel, length T being 13% of the length L of the sides of the canopy, and height H being from 10% to 28% of the length L of the sides of the canopy.

4. The parachute of claim 3 wherein height H is 28% of the length L of the sides of the canopy.

5. The parachute of claim 3 further comprising slots disposed through the canopy having length equal to 30% of the length L of the sides of the canopy.

6. The parachute of claim 4 wherein the suspension lines extend across and are fixed to the diagonals of the canopy.

* * * * *